United States Patent
Choi et al.

(10) Patent No.: US 8,429,537 B2
(45) Date of Patent: *Apr. 23, 2013

(54) REMOTE CONTROLLER SUPPORTING SYSTEM AND METHOD FOR DISPLAYING FUNCTION OF KEY BEING MAPPED WITH REMOTE CONTROLLER

(75) Inventors: Jun Kyun Choi, Daejeon (KR); Jinhong Yang, Daejeon (KR); Hyojin Park, Daejeon (KR); Kyong-Il Cho, Gyeonggi-do (KR); Wonjoo Park, Daejeon (KR); Kee Seong Cho, Daejeon (KR); Won Ryu, Daejeon-si (KR)

(73) Assignees: Korea Advanced Institute of Science and Technology, Daejeon (KR); Electronics and Telecommunications Research Institute, Daejeon (KR)

(*) Notice: Subject to any disclaimer, the term of this patent is extended or adjusted under 35 U.S.C. 154(b) by 324 days.

This patent is subject to a terminal disclaimer.

(21) Appl. No.: 12/694,496

(22) Filed: Jan. 27, 2010

(65) Prior Publication Data

US 2011/0072369 A1 Mar. 24, 2011

(30) Foreign Application Priority Data

Sep. 21, 2009 (KR) .................. 10-2009-0089270
Nov. 6, 2009 (KR) .................. 10-2009-0106864

(51) Int. Cl.
*G06F 3/00* (2006.01)
(52) U.S. Cl.
USPC .................. 715/740; 345/169; 340/815
(58) Field of Classification Search .................. 715/740, 715/760; 340/815; 345/169
See application file for complete search history.

(56) References Cited

U.S. PATENT DOCUMENTS

| 5,386,251 | A | * | 1/1995 | Movshovich | 348/734 |
| 5,903,259 | A | * | 5/1999 | Brusky et al. | 345/168 |
| 5,940,074 | A | * | 8/1999 | Britt et al. | 715/749 |
| 5,949,412 | A | * | 9/1999 | Huntsman | 715/740 |
| 6,034,689 | A | * | 3/2000 | White et al. | 715/854 |
| 6,104,334 | A | * | 8/2000 | Allport | 341/175 |
| 6,130,625 | A | * | 10/2000 | Harvey | 340/12.24 |
| 6,772,394 | B1 | * | 8/2004 | Kamada | 715/210 |
| 7,656,464 | B2 | * | 2/2010 | Pfiffer | 348/734 |
| 2003/0156053 | A1 | * | 8/2003 | Wall et al. | 341/176 |

(Continued)

FOREIGN PATENT DOCUMENTS

| KR | 10-2004-0047854 A | 6/2004 |
| KR | 10-2005-0079580 A | 8/2005 |
| KR | 10-2007-0031639 A | 3/2007 |

*Primary Examiner* — Phenuel Salomon
(74) *Attorney, Agent, or Firm* — Pearne & Gordon LLP (57) ABSTRACT

Provided is a remote controller supporting system and method that may display, on objects included in a webpage, keys of a remote controller corresponding to the objects and manipulation schemes, respectively. The remote controller supporting system may include: a profile storage unit to store a plurality of profiles containing functions of the remote controller and information associated with the functions of the remote controller; a receiver to receive an input signal from the remote controller, and to interpret a meaning of the input signal based on a profile corresponding to the remote controller; an event unit to transform the meaning of the input signal to an event form; and a presentation unit to access a web server to display a webpage, to transform, to a predetermined behavior, at least one event transformed by the event unit, and to request the web server for an operation corresponding to the behavior.

13 Claims, 8 Drawing Sheets

U.S. PATENT DOCUMENTS

| | | | |
|---|---|---|---|
| 2006/0259864 A1* | 11/2006 | Klein et al. | 715/738 |
| 2010/0079680 A1* | 4/2010 | White et al. | 348/734 |
| 2010/0123834 A1* | 5/2010 | Brodersen et al. | 348/734 |
| 2010/0229194 A1* | 9/2010 | Blanchard et al. | 725/39 |

* cited by examiner

REMOTE CONTROLLER SUPPORTING SYSTEM AND METHOD FOR DISPLAYING FUNCTION OF KEY BEING MAPPED WITH REMOTE CONTROLLER

CROSS-REFERENCE TO RELATED APPLICATIONS

This application claims the benefit of Korean Patent Application No. 10-2009-0089270, filed on Sep. 21, 2009, and Korean Patent Application No. 10-2009-0106864, filed on Nov. 6, 2009, in the Korean Intellectual Property Office, the disclosures of which are incorporated herein by reference.

BACKGROUND

1. Field of the Invention

The present invention relates to a system and method that may match objects included in a website with keys of a remote controller, respectively, and display a matching key on a corresponding object and thereby may provide a user with information associated with an operation of a corresponding object when the user pushes a predetermined key.

2. Description of the Related Art

With developments of networks and displays such as a television (TV), an Internet Protocol TV (IPTV) and products enabling a user to check websites even on a TV screen have appeared.

Unlike TV programs or motion pictures, various objects are included in a single website and thereby are displayed. Accordingly, a scheme of enabling a user to select a desired object from the various objects becomes an issue.

The above object selection scheme may include, for example, a scheme of mapping a predetermined object with a predetermined key of a remote controller, and enabling the mapping predetermined object to be selected when a user pushes the predetermined key. In this scheme, when the user has no experience of visiting a corresponding website, the user may be unaware of which object matches which key.

In addition, an input device for a TV such as a remote controller does not employ the same buttons or input signals as a keyboard or a mouse, and uses different buttons for each product. Accordingly, when the user visits the same website, a different remote controller may be used, and the user may be unaware that a different button from a button on a previously used remote controller matches a corresponding object.

When a predetermined object supports a predetermined function, the user may be unaware of a function of each object.

Accordingly, there is a need for a system and method that may provide a user with a key enabling the user to select an object, and provide information associated with a function of the selected object and the key for using the function.

SUMMARY

An aspect of the present invention provides a system and method that may match objects included in a website with respective keys of a remote controller, and display a matching key on a corresponding object and thereby may provide a user with information associated with an operation of a corresponding object when the user pushes a predetermined key.

Another aspect of the present invention also provides a system and method that may display, on a predetermined object, a key of a remote controller corresponding to the predetermined object and a manipulation scheme of the key when the predetermined object supports a particular function with regards to a predetermined key manipulation of the remote controller, and thereby enables even a first-time webpage visitor to use the predetermined function of the predetermined object included in the webpage with being aware of the predetermined function.

According to an aspect of the present invention, there is provided a system for supporting a remote controller, the system including: a profile storage unit to store a plurality of profiles containing functions of the remote controller and information associated with the functions of the remote controller; a receiver to receive an input signal from the remote controller, and to interpret a meaning of the input signal based on a profile corresponding to the remote controller; an event unit to transform the meaning of the input signal to an event form; and a presentation unit to access a web server to display a webpage, to transform, to a predetermined behavior, at least one event transformed by the event unit, and to request the web server for an operation corresponding to the behavior. The presentation unit may display, on objects included in the webpage, keys of the remote controller corresponding to the objects, respectively.

The presentation unit may include: a code library to store the objects and keys of the remote controller corresponding to the objects; a web screen controller to access the web server to display the webpage and the keys of the remote controller corresponding to the objects; a storage unit to store a behavior list containing behaviors and the at least one event corresponding to each of the behaviors; a buffer to sequentially receive and store the at least one event from the event unit; and an interpreter to verify whether a behavior matching the at least one event exists in the behavior list by comparing the at least one event stored in the buffer with the behavior list, and to transform the matching at least one event to the verified behavior when the behavior matching the at least one event is included in the behavior list.

According to another aspect of the present invention, there is provided a method of supporting a remote controller, the method including: accessing a web server; verifying a behavior list available in the web server; editing a webpage of the web server to display keys of the remote controller corresponding to objects included in the webpage; displaying the edited webpage; receiving an input signal from the remote controller; interpreting the input signal using the verified behavior list to verify a behavior requested by a user; and transmitting an operation command corresponding to the verified behavior to the web server so that the web server performs a corresponding operation.

The interpreting and the verifying may include: interpreting the received input signal; transforming the input signal to an event based on the interpretation result; sequentially inputting and storing the event in a buffer; comparing at least one event stored in the buffer with the behavior list to verify whether a behavior matching the at least one event is included in the behavior list; and transforming the verified at least one event to the corresponding behavior.

According to embodiments of the present invention, it is possible to provide a user with information associated with an operation of a corresponding object when the user pushes a predetermined key by matching objects included in a website with respective keys of a remote controller, and by displaying a matching key on a corresponding object.

Also, according to embodiments of the present invention, it is possible to enable even a first-time webpage visitor to use a predetermined function of a predetermined object included in a webpage with being aware of the predetermined function by displaying, on the predetermined object, a key of a remote controller corresponding to the predetermined object and a manipulation scheme of the key when the predetermined object supports a particular function with regards to a predetermined key manipulation of the remote controller.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to embodiments of the present invention, it is possible to provide a user with information associated with an operation of a corresponding object when the user pushes a predetermined key by matching objects included in a website with respective keys of a remote controller, and by displaying a matching key on a corresponding object.

Figure 1:
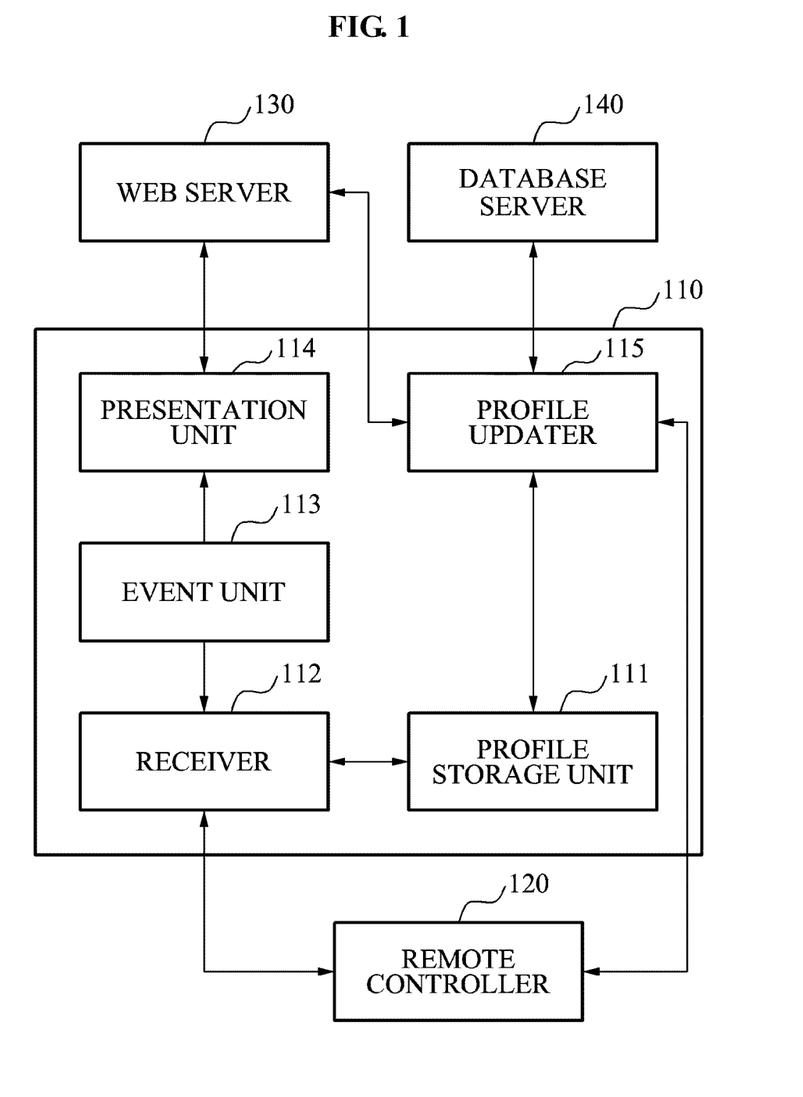
FIG. 1 is a block diagram illustrating a system for supporting a remote controller according to an embodiment of the present invention.

FIG. 1 is a block diagram illustrating a system 110 for supporting a remote controller 120 according to an embodiment of the present invention.

As shown in FIG. 1, the remote controller supporting system 110 may include a profile storage unit 111, a receiver 112, an event unit 113, a presentation unit 114, and a profile updater 115.

The profile storage unit 111 may include a plurality of profiles containing functions and information associated with the functions of the remote controller 120.

Each of the profiles may include functions of a remote controller of a different type and information associated with the functions.

The receiver 112 may receive an input signal from the remote controller 120, and interpret a meaning of the input signal based on a profile corresponding to the remote controller 120.

Specifically, when the receiver 112 receives the input signal from the remote controller 120, the receiver 112 may identify a type of the remote controller 120 based on the received input signal, retrieve the profile corresponding to the remote controller 120 from the profile storage unit 111, and interpret the meaning of the input signal based on the retrieved profile corresponding to the remote controller 120.

For example, when a predetermined key of the remote controller 120 is selected, the receiver 112 may interpret that the predetermined key is selected based on the input signal.

When the receiver 112 may not identify the type of the remote controller 120 based on the received input signal, the receiver 112 may receive, from a user, a predetermined pattern with respect to the remote controller 112.

When the profile corresponding to the remote controller 120 does not exist in the profile storage unit 111, the receiver 112 may execute the profile updater 115 to store a new profile corresponding to the remote controller 120 in the profile storage unit 111.

The event unit 113 may transform the interpreted meaning of the input signal to an event form, and may store and mange a corresponding event.

For example, when the receiver 112 interprets that the meaning of the input signal indicates a predetermined key is selected, the event unit 113 may transform the input signal to an event indicating the predetermined key is selected, and may store the event. In this instance, the event unit 113 may store, in an internal storage device, a name of the event and a value of the event.

The presentation unit 114 may access a web server 130 to display a webpage, may transform, to a predetermined behavior, at least one event interpreted by the receiver 112, and may transmit an operation command corresponding to the behavior to the web server 130 to perform a corresponding operation on the webpage.

The presentation unit 114 may display, on objects included in the webpage, keys of the remote controller 120 corresponding to the objects, respectively.

Figure 2:
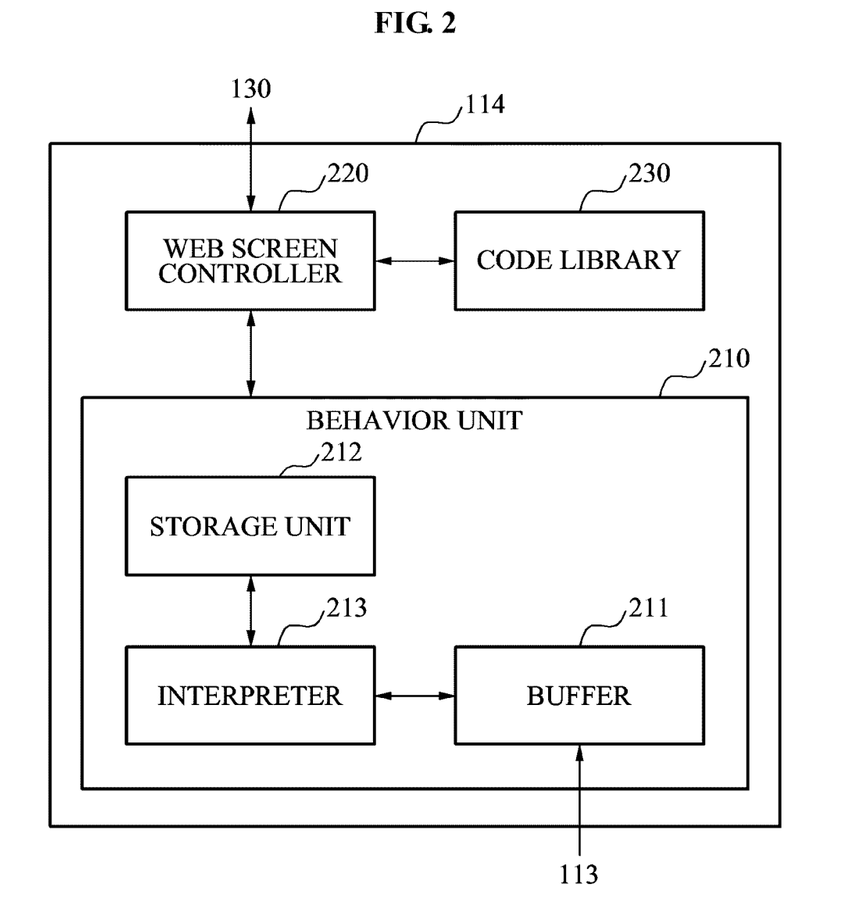
FIG. 2 is a block diagram illustrating a configuration of a presentation unit of FIG. 1.

For example, the presentation unit 114 may store the verified behavior in a storage unit 212 of FIG. 2, periodically perform polling with respect to behaviors stored in the storage unit 212, and transmit, to the web server 130, an operation command corresponding to the polled behavior.

A configuration and an operation of the presentation unit 114 will be further described with reference to FIG. 2.

According to a request of the receiver 112, the profile updater 115 may access an external storage medium storing a new profile to download the new profile, and may store the downloaded new profile in the profile storage unit 111. In this instance, the profile updater 115 may select and access at least one of external storage media based on the identified remote controller type.

The external storage medium storing the new profile may correspond to one of a storage unit of the remote controller 120, the web server 130, and a database server 140. For example, the remote controller 120 may store its own profile in the storage unit of the remote controller 120. The web server 130 may store profiles with respect to remote controllers supportable over the webpage. The database server 140 may exclusively store the profiles.

FIG. 2 is a block diagram illustrating a configuration of the presentation unit 114 of FIG. 1.

As shown in FIG. 2, the presentation unit 114 may include a behavior unit 210, a web screen controller 220, and a code library 230.

The behavior unit 210 may transform, to a predetermined behavior, at least one event stored in the event unit 113, and may request the web server 130 for an operation corresponding to the transformed behavior.

The behavior unit 210 may include a buffer 211, the storage unit 212, and an interpreter 213.

The buffer 211 may sequentially receive an event from the event unit 113 and store the received event in a received sequence. The event unit 113 may transmit the event to the buffer 211 in an interpreted sequence of the receiver 112.

The storage unit 212 may store a behavior list and behaviors transformed by the interpreter 213. The behavior list may include behaviors and at least one event corresponding to each of the behaviors.

The interpreter 213 may compare the at least one event stored in the buffer 211 with the behavior list. When the behavior list includes a behavior matching the at least one event, the interpreter 213 may transform the at least one event to the corresponding behavior. The interpreter 213 may transform N events to M behaviors. Here, N and M denote different integers.

The interpreter 213 may delete, from the buffer 211, the at least one event transformed to the corresponding behavior, and thereby may prevent a portion of the transformed at least one event from combining with another event and being transformed to another behavior.

When the presentation unit 114 is connected to the web server 130, the interpreter 213 may retrieve and load, from the storage unit 212, a behavior list used in the web server 230, and may compare the loaded behavior list with at least one event stored in the buffer 211.

The webpage of the web server 130 connected by the interpreter 213 may include a document in a JavaScript format performing an operation according to a request of the behavior unit 210.

The interpreter 213 may interpret a HyperText Markup Language (HTML) and a Cascading Style Sheet (CSS) of the webpage to process a corresponding event.

The web screen controller 220 may access the web server 130 to display the webpage of the web server 130 and keys of the remote controller 120 corresponding to objects included in the webpage.

The web screen controller 220 may access the web server 130 to load the webpage, recreate the loaded webpage so that the keys of the remote controller 120 corresponding to the objects may be displayed on the loaded webpage, and may display the recreated webpage.

Specifically, the web screen controller 220 may select an object controllable using a key of the remote controller 120 on the loaded webpage, match the selected object with the key of the remote controller 120, and may recreate the loaded webpage so that the matching key of the remote controller 120 may be displayed to be adjacent to the selected object.

The web screen controller 220 may set whether to display a corresponding key for each of the objects included in the webpage, and may display only a key corresponding to an object set as a display.

When a predetermined object supports a predetermined function according to a key manipulation of the remote controller 120, the web screen controller 220 may display, on the corresponding object, a key of the remote controller 120 corresponding to the predetermined object and a manipulation scheme of the key.

The code library 230 may store objects and keys of the remote controller 120 corresponding to the objects.

Specifically, the code library 230 may include information regarding objects, a function of each of the objects, at least one key of the remote controller 120 corresponding to each of the objects, and an operational pattern of a key corresponding to each function.

Various keys of the remote controller 120 may be set to correspond to objects, and the setting may be changed by a user.

Figure 3:
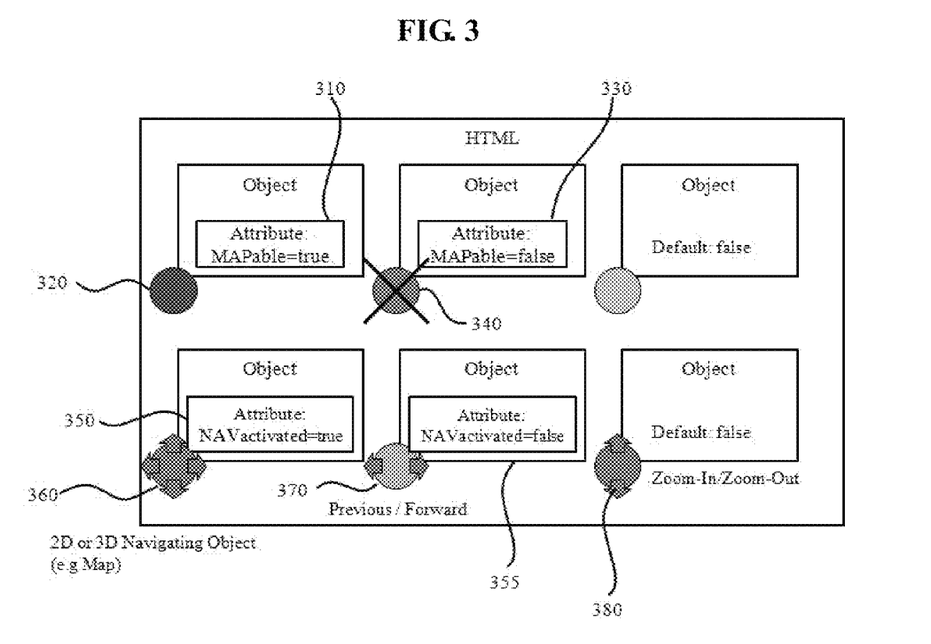
FIG. 3 is a diagram illustrating an example of a webpage displayed by a web screen controller of FIG. 2 according to an embodiment of the present invention.

FIG. 3 is a diagram illustrating an example of a webpage displayed by the web screen controller 220 according to an embodiment of the present invention.

As shown in FIG. 3, the web screen controller 220 may display, on objects, keys of the remote controller 120 corresponding to the objects, respectively, in a website containing the objects.

When the code library 230 indicates an attribute of an object as "MAPable=true" as shown in a block 310, the web screen controller 220 may display a red key 320 that is a corresponding key of the remote controller 320.

Conversely, when the code library 230 indicates an attribute of an object as "MAPable=false" as shown in a block 330, the web screen controller 220 may restrict a display of a blue key 340 that is a corresponding key of the remote controller 120.

Also, in the case of a flash object that may intercept an input of a user using the remote controller 120, the web screen controller 220 may set a default of the flash object to be in an inactivated state. For example, when an attribute of an object is indicated as "NAVactivated=true" as shown in a block 350, the web screen controller 220 may assign a priority of the key to the corresponding object to be automatically activated. As another example, when the attribute of the object is indicated as "NAVactivated=false" as shown in a block 355, the web screen controller 220 may set a predetermined key of the remote controller 120 as an object activation key and enable the predetermined key to be activated when the user pushes the predetermined key.

When the flash object is activated, the web screen controller 220 may display a key of the remote controller 120 available for the user and a manipulation scheme 360 of the key to manipulate the flash object. When the object can move only forward and backward, the web screen controller 220 may display a key 370 with only left and right arrows. When the object can move only up and down such as zoom in and zoom out, the web screen controller 220 may display a key 380 with only up and down arrows. Through this, the web screen controller 220 may display how to activate a corresponding function of a key.

Figure 4:
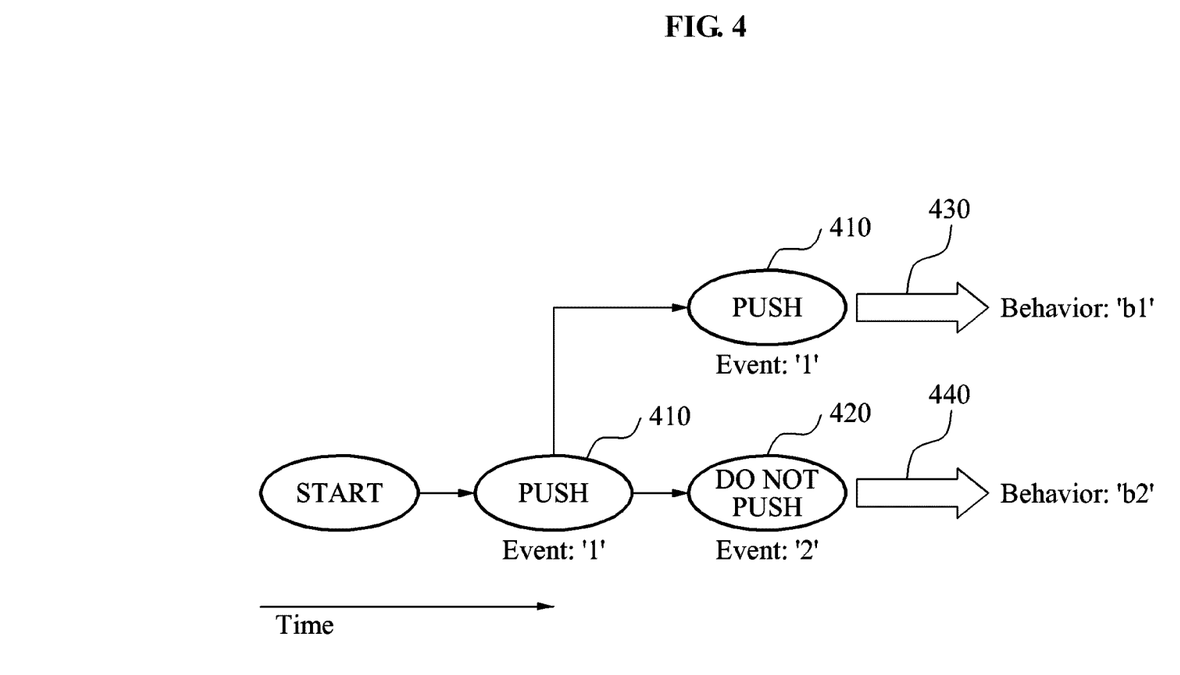
FIG. 4 is a diagram illustrating a difference between a behavior and an event used in the remote controller supporting system of FIG. 1 according to an embodiment of the present invention.

FIG. 4 is a diagram illustrating a difference between a behavior and an event used in the remote controller supporting system 110 according to an embodiment of the present invention.

Referring to FIG. 4, when a predetermined key is being pushed during a predetermined period of time, the remote controller supporting system 110 may set a corresponding behavior 1 to b1. When the predetermined key is pushed only once, the remote controller supporting system 110 may set a corresponding behavior 2 to b2.

When the user pushes the predetermined key of the remote controller 120, the receiver 112 receiving an input signal may interpret an event (1) 410 indicating the predetermined key is pushed, and may transfer the interpretation result to the event unit 113. The event unit 113 may store the event (1) 410 in the buffer 211.

In this example, when the user keeps pushing the predetermined key, the receiver 112 receiving the input signal may interpret the event (1) 410 indicating the predetermined key is pushed, and may continuously transfer the interpretation result to the event unit 113. The event unit 113 may continuously store the event (1) 410 in the buffer 211. In this instance, when the event (1) 410 is continuously stored in the buffer 211 more than a predetermined number of times, the interpreter 213 may determine the user is pushing the predetermined key during the predetermined period of time and thereby transform the event (1) 410 to behavior 1 (b1) as indicated by an arrow 430.

When the user takes a finger off from the predetermined key of the remote controller 120, the receiver 112 receiving an input signal may interpret an event (2) 420 indicating the predetermined key is not pushed, and transfer the interpretation result to the event unit 113. The event unit 113 may store, in the buffer 211, the event (2) 420 after the event (1) 410. In this instance, when the event (1) 410 and the event (2) 420 are sequentially stored in the buffer 211, the interpreter 213 may determine the predetermined key is pushed only once and thereby may transform the event (1) 410 and the event (2) 420 to behavior 2 (b2) as indicated by an arrow 440.

Figure 5:
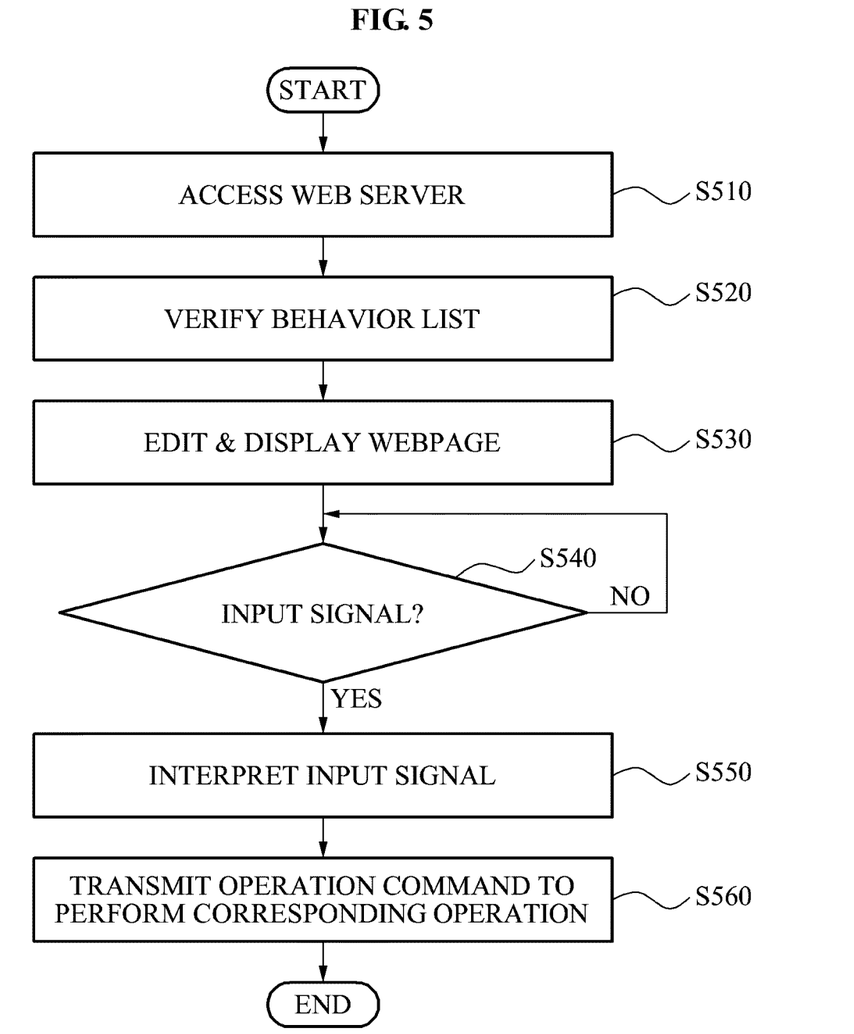
FIG. 5 is a flowchart illustrating a method of supporting a remote controller according to an embodiment of the present invention.

FIG. 5 is a flowchart illustrating a method of supporting the remote controller 120 according to an embodiment of the present invention.

In operation S510, the presentation unit 114 may access the web server 130 according to a user request. The web screen controller 220 included in the presentation unit 114 may load a webpage of the web server 130 and temporarily store the loaded webpage.

In operation S520, the presentation unit 114 may verify a behavior list available in the web server 130.

In operation S530, the presentation unit 114 may edit the webpage so that keys of the remote controller 120 corresponding to objects included in the webpage may be displayed on the objects, respectively, and may display the edited webpage.

Operation S530 of editing and displaying the webpage will be further described with reference to FIG. 6.

In operation S540, the receiver 112 may verify whether an input signal is received from the remote controller 120. When the input signal is not received, the receiver 112 may be in an idle state.

In operation S550, the presentation unit 114 may interpret the received input signal to verify a behavior requested by the user using the behavior list. In this instance, the presentation unit 114 may store the verified behavior in the storage unit 212.

Operation S550 of interpreting the input signal will be further described with reference to FIG. 7.

In operation S560, the presentation unit 114 may transmit an operation command corresponding to the verified behavior to the web server 130 to perform a corresponding operation in the webpage. The presentation unit 114 may periodically perform polling with respect to behaviors stored in the storage unit 212, and may transmit, to the web server 130, an operation corresponding to the polled behavior.

Figure 6:
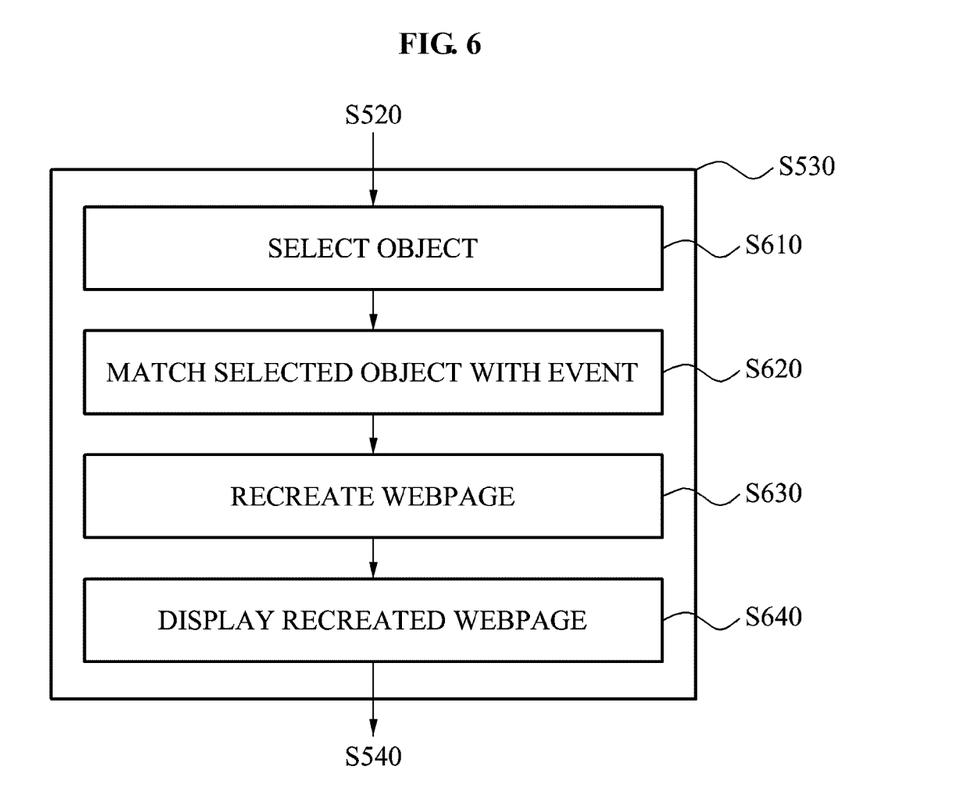
FIG. 6 is a flowchart illustrating an operation of editing and displaying a webpage of FIG. 5.

FIG. 6 is a flowchart illustrating operation 530 of editing and displaying a webpage of FIG. 5. Operations S610 through S640 may be included in operation S530.

In operation S610, the web screen controller 220 may select an object controllable using a predetermined key of the remote controller 120 on the loaded webpage. Specifically, the web screen controller 220 may classify objects, included in the loaded webpage, into controllable objects and uncontrollable objects using the predetermined key of the remote controller 120 based on attributes of the objects.

In operation S620, the web screen controller 220 may match the selected object with a key of the remote controller 120.

For example, the web screen controller 220 may match the selected object with an event transformed by the event unit 113. The transformed event may correspond to an event transformed from an input signal inputted into the receiver 112 when the user pushes the key of the remote controller 120.

In operation S630, the web screen controller 220 may recreate the webpage so that the matching key of the remote controller 120 may be displayed to be adjacent to the selected object. For example, the web screen controller 220 may modify a design file of the webpage so that the matching key of the remote controller 120 may be displayed to be adjacent to the selected object.

In operation S640, the web screen controller 220 may display the recreated webpage and wait for an input of the user using the remote controller 120.

Figure 7:
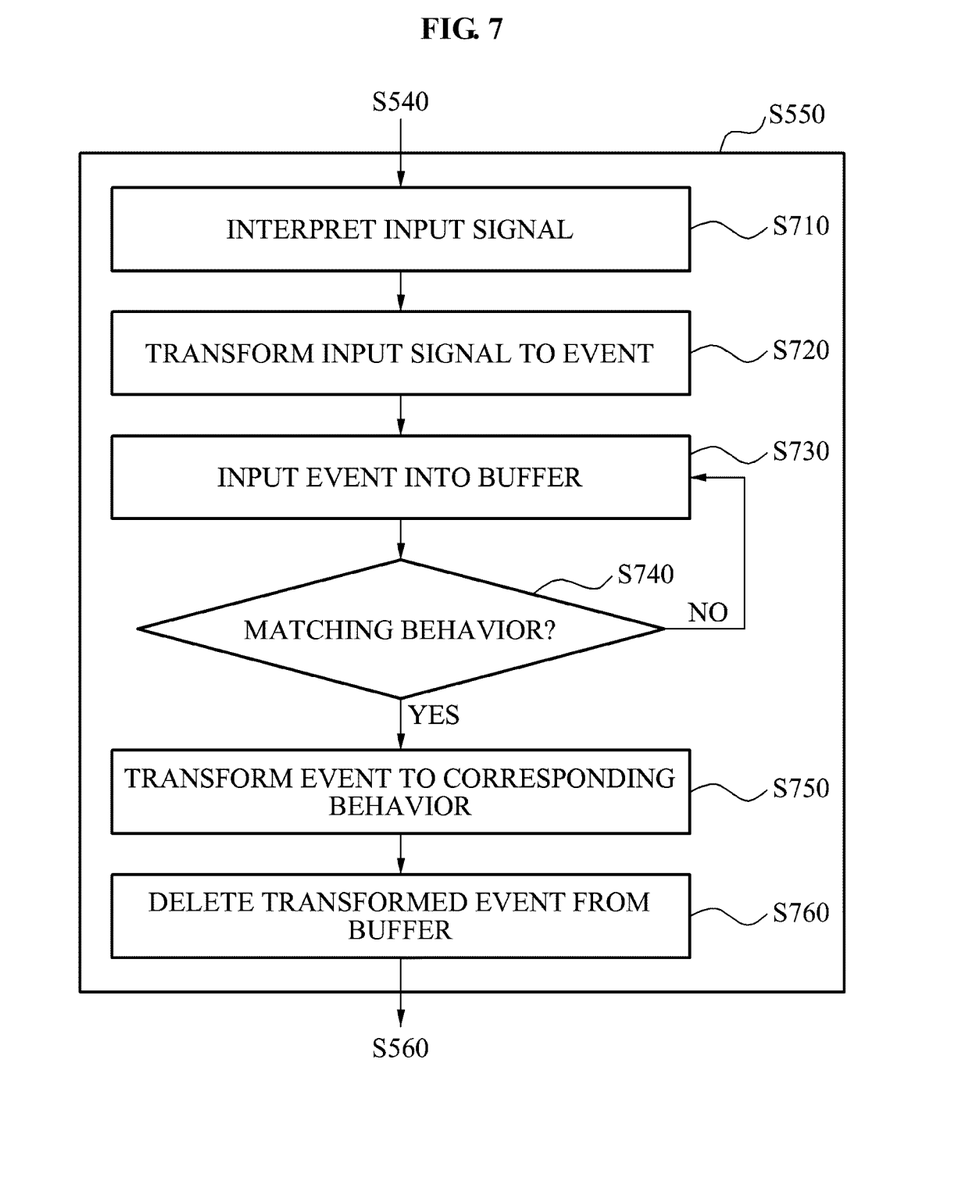
FIG. 7 is a flowchart illustrating an operation of interpreting an input signal of FIG. 5.

FIG. 7 is a flowchart illustrating operation S550 of interpreting the input signal of FIG. 5. Operation S710 through S760 may be included in operation S550.

In operation S710, the receiver 112 may identify a type of the remote controller 120 based on the received input signal, may retrieve, from the profile storage unit 111, a profile corresponding to the identified type of the remote controller 120, and may interpret an event of the input signal based on the retrieved profile.

In operation S720, the receiver 112 may transform the received input signal to an event based on the interpreted event of the input signal, and store the transformed event in the event unit 113.

In operation S730, the event unit 113 may sequentially input the stored event into the buffer 211.

In operation S740, the interpreter 213 may compare at least one event stored in the buffer 211 with the verified behavior list, and may verify whether the behavior list includes a behavior matching the at least one event.

In operation S750, the interpreter 213 may transform, to the corresponding behavior, the at least one event verified to match the behavior.

The interpreter 213 may store the transformed behavior in the storage unit 212.

In operation S760, the interpreter 213 may delete, from the buffer 211, the at least one event transformed to the behavior.

Figure 8:
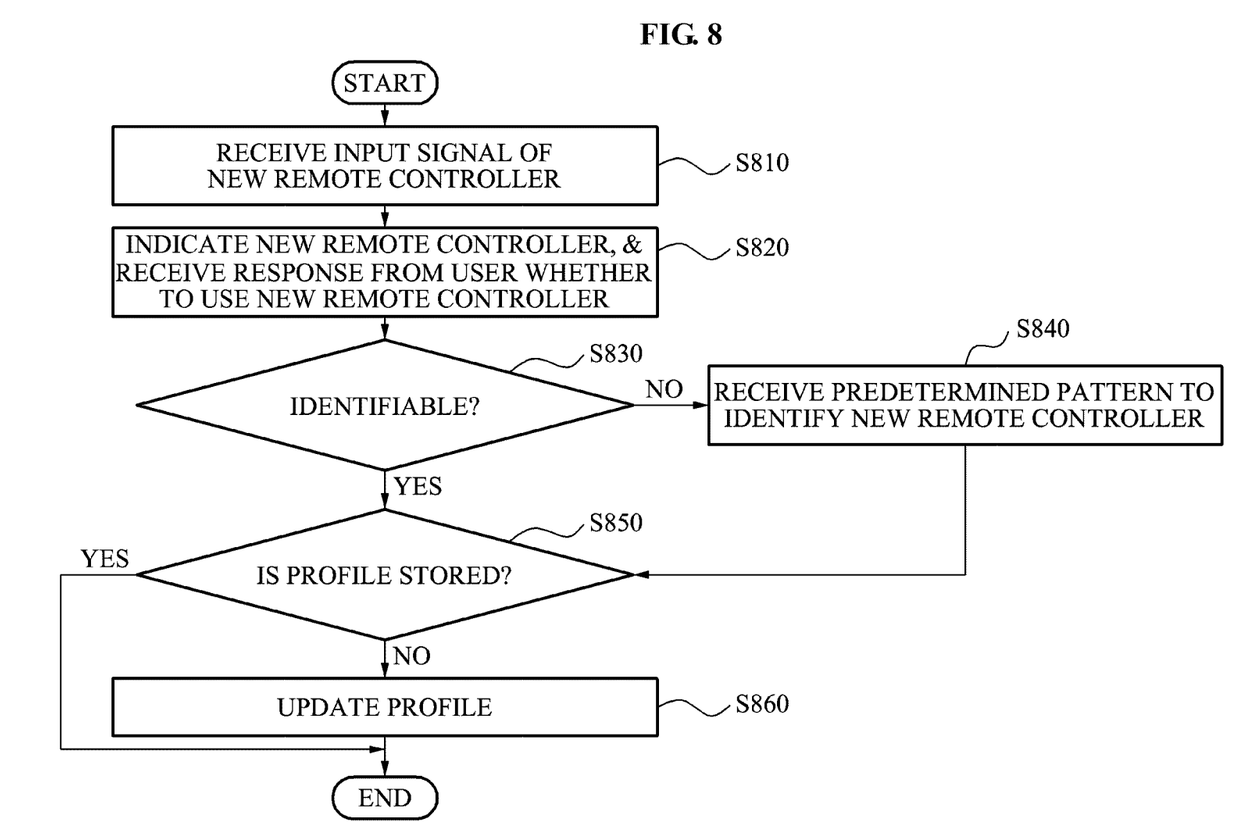
FIG. 8 is a flowchart illustrating a method of recognizing, by a remote controller supporting system, a new remote controller according to an embodiment of the present invention.

FIG. 8 is a flowchart illustrating a method of recognizing, by the remote controller supporting system 110, a new remote controller according to an embodiment of the present invention.

FIG. 8 illustrates a process of recognizing, by the remote controller supporting system 110, the remote controller 120 when the remote controller supporting system 110 initially accesses the remote controller 120, or when a user desires to use the new remote controller in the remote controller supporting system 110.

In operation S810, the receiver 112 may receive an input signal of the new remote controller.

In operation S820, when the input signal is not transmitted from the existing remote controller 120, the receiver 112 may indicate the new remote controller, and may receive a response from the user about whether to use the new remote controller.

In operation S830, the receiver 112 may verify whether a type of the new remote controller is identifiable based on the received input signal.

When the type of the new remote controller is unidentifiable, the receiver 112 may request the user for a predetermined pattern to identify the new remote controller, and may receive the predetermined pattern from the user in operation S840. The receiver 112 may identify the type of the new remote controller based on the predetermined pattern received from the user.

In operation S850, the receiver 112 may verify whether a profile corresponding to the identified type of the new remote controller is stored in the profile storage unit 111. When the corresponding profile is stored in the profile storage unit 111, the receiver 112 may perform operation S710 of interpreting the input signal based on the profile.

When the corresponding profile is not stored in the profile storage unit 111, the receiver 112 may execute the profile updater 115 to update a new profile corresponding to the new remote controller to the profile storage unit 111 in operation S860.

The profile updater 115 may select and access at least one of external storage media storing profiles based on the identified type of the new remote controller, download the new profile corresponding to the new remote controller, and store the downloaded new profile in the profile storage unit 111.

As described above, according to an embodiment of the present invention, a remote controller supporting system may match objects included in a website with respective keys of a remote controller, and display a matching key on a corresponding object and thereby may provide a user with information associated with an operation of a corresponding object when the user pushes a predetermined key.

In addition, the remote controller supporting system may display, on a predetermined object, a key of a remote controller corresponding to the predetermined object and a manipulation scheme of the key when the predetermined object supports a particular function with regards to a predetermined key manipulation of the remote controller. Accordingly, even a first-time webpage visitor may use the predetermined function of the predetermined object included in the webpage with being aware of the predetermined function.

The remote controller supporting method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for supporting a remote controller, the system comprising:
    a profile storage unit to store a plurality of profiles containing functions of the remote controller and information associated with the functions of the remote controller;
    a receiver to receive an input signal from the remote controller, and to interpret the input signal based on a profile corresponding to the remote controller, wherein the input signal is related to a pushed key of the remote controller by a user;
    an event unit to transform the input signal to an event, wherein the event indicates the key of the remote; and
    a presentation unit to access a web server to display a webpage, to transform the event to a predetermined behavior, and to request the web server for an operation corresponding to the behavior,
    wherein the receiver identifies the remote controller based on the input signal,
    wherein the presentation unit comprises:
    a buffer to sequentially store the event received from the event unit; and
    an interpreter to transform the event to the behavior based on the behavior list, and to delete the event transformed to the behavior in the buffer,
    wherein the presentation unit classifies the objects into controllable objects and uncontrollable objects using the key of the remote controller, based on attributes of the objects, matches the controllable objects with the key of the remote controller, and displays the controllable objects and the key of the remote controller corresponding to the controllable objects in the webpage,
    wherein the presentation unit matches the controllable objects with the event related to the key of the remote controller,
    wherein the key of the remote controller related to available moving direction of objects activates to display in the webpage, and
    wherein the transforming the event to a predetermined behavior, stores sequentially the event in a buffer, and transforms the event to the behavior based on the behavior list, and delete the event transformed to the behavior in the buffer.

2. The system of claim 1, wherein the presentation unit comprises:
    a code library to store the objects and keys of the remote controller corresponding to the objects;
    a storage unit to store a behavior list containing behaviors and the at least one event corresponding to each of the behaviors;
    a buffer to sequentially receive and store the at least one event from the event unit; and
    an interpreter to verify whether a behavior matching the at least one event exists in the behavior list by comparing the at least one event stored in the buffer with the behavior list, and to transform the matching at least one event to the verified behavior when the behavior matching the at least one event is included in the behavior list.

3. The system of claim 2, wherein, when the presentation unit accesses the web server, the interpreter retrieves, from the storage unit, a behavior list used in the web server to load the retrieved behavior list.

4. The system of claim 1, wherein the web screen controller sets whether to display a corresponding key for each of the objects, and displays a key corresponding to an object set as a display.

5. The system of claim 1, wherein, when a predetermined object supports a predetermined function according to a key manipulation of the remote controller, the web screen controller displays, on the predetermined object, a key of the remote controller corresponding to the predetermined object and a manipulation scheme of the key.

6. The system of claim 1, further comprising:
a profile updater to access an external storage medium storing a new profile to download the new profile, and to store the downloaded new profile in the profile storage unit.

7. The system of claim 6, wherein:
the receiver retrieves a profile corresponding to the identified remote controller from the profile storage unit, and
when the profile corresponding to the identified remote controller does not exist in the profile storage unit, the receiver executes the profile updater to store a new profile corresponding to the remote controller in the profile storage unit.

8. The system of claim 6, wherein the external storage medium storing the new profile corresponds to one of a storage unit of the remote controller, the web server, and a database server.

9. A method of supporting a remote controller, the method comprising:
displaying controllable objects and a key of the remote controller corresponding to the controllable objects in the webpage;
receiving an input signal from a remote controller;
interpreting the input signal based on a profile of the remote controller containing functions of the remote controller and information associated with the functions of the remote controller,
wherein the input signal is related to a pushed key of the remote controller by a user,
transforming the input signal to an event, wherein the event indicates the key of the remote and a number of times related the pushed key of the remote controller during a predetermined period of time; and
transforming the event to a predetermined behavior, and requesting the web server for an operation corresponding to the behavior,
wherein the displaying classifies the objects into controllable objects and uncontrollable objects using the key of the remote controller, based on attributes of the objects, matches the controllable objects with the key of the remote controller, and displays the controllable objects and the key of the remote controller corresponding to the controllable objects in the webpage, wherein the controllable objects are matched with the event related to the key of the remote controller,
wherein the key of the remote controller related to available moving direction of objects activates to display in the webpage,
wherein the transforming the event to a predetermined behavior, stores sequentially the event in a buffer, and transforms the event to the behavior based on the behavior list, and delete the event transformed to the behavior in the buffer.

10. The method of claim 9, wherein the editing comprises displaying, on a predetermined object, a key of the remote controller corresponding to the predetermined object and a manipulation scheme of the key.

11. The method of claim 9, wherein the behavior list includes a behavior operable in the web server, and includes at least one event corresponding to the behavior.

12. The method of claim 11, wherein the interpreting and the verifying comprises:
interpreting the received input signal;
transforming the input signal to an event based on the interpretation result;
sequentially inputting and storing the event in a buffer;
comparing at least one event stored in the buffer with the behavior list to verify whether a behavior matching the at least one event is included in the behavior list; and
transforming the verified at least one event to the corresponding behavior.

13. The method of claim 12, wherein the interpreting and the verifying further comprises:
deleting, from the buffer, the at least one event transformed to the behavior;
identifying a type of the remote controller based on the input signal;
retrieving a profile corresponding to the remote controller based on the identified type of the remote controller;
interpreting an event of the input signal based on the retrieved profile; and
accessing an external storage medium storing the profile corresponding to the remote controller to download and store the profile corresponding to the remote controller when the profile corresponding to the remote controller is not retrieved.

* * * * *